United States Patent
Casaburo et al.

(10) Patent No.: US 11,804,014 B1
(45) Date of Patent: Oct. 31, 2023

(54) CONTEXT-BASED APPLICATION PLACEMENT

(71) Applicant: Apple Inc., Cupertino, CA (US)

(72) Inventors: Daniele Casaburo, San Jose, CA (US); Anselm Grundhoefer, Saratoga, CA (US); Eshan Verma, Mountain View, CA (US); Omar Elafifi, Oakland, CA (US); Pedro Da Silva Quelhas, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/845,461

(22) Filed: Apr. 10, 2020

Related U.S. Application Data

(60) Provisional application No. 62/836,818, filed on Apr. 22, 2019.

(51) Int. Cl.
*G06T 19/00* (2011.01)
(52) U.S. Cl.
CPC .................. *G06T 19/006* (2013.01)
(58) Field of Classification Search
CPC .................................................. G06T 19/006
See application file for complete search history.

(56) References Cited

U.S. PATENT DOCUMENTS

| | | | |
|---|---|---|---|
| 8,509,483 B2 | 8/2013 | Lawrence Ashok Inigo | |
| 10,162,308 B2 | 12/2018 | Du | |
| 11,287,659 B2 | 3/2022 | Hoover et al. | |
| 11,328,484 B2 | 5/2022 | Powderly et al. | |
| 2015/0301797 A1 | 10/2015 | Miller | |
| 2016/0048311 A1 | 2/2016 | Purvis et al. | |
| 2016/0291922 A1* | 10/2016 | Montgomerie | G09B 5/125 |
| 2018/0130260 A1* | 5/2018 | Schmirler | G06T 19/006 |
| 2018/0322706 A1* | 11/2018 | Drouin | G02B 27/0172 |
| 2019/0213792 A1* | 7/2019 | Jakubzak | G06F 3/017 |
| 2019/0339840 A1* | 11/2019 | Park | G02B 27/017 |
| 2019/0371279 A1* | 12/2019 | Mak | G06F 3/011 |
| 2019/0392640 A1* | 12/2019 | Qian | G06K 9/00671 |

OTHER PUBLICATIONS

Gal et al. (NPL "FLARE: Fast Layout for Augmented Reality Applications") Citation: Gal et al, "FLARE: Fast Layout for Augmented Reality Applications", IEEE International Symposium on Mixed and Augmented Reality, 2014 (Year: 2014).*
Chen, L. et al., "Context-Aware Mixed Realty: A Learning-Based Framework for Semantic-Level Interaction,", Computer Graphics Forum, vol. 39, No. 1, pp. 484-496 (2020), https://onlinelibrary.wiley.com/doi/full/10.1111/cgf.13887.

\* cited by examiner

*Primary Examiner* — Diane M Wills
(74) *Attorney, Agent, or Firm* — Thompson Hine LLP

(57) ABSTRACT

In some implementations, representations of applications are identified, positioned, and configured in a computer generated reality (CGR) environment based on context. The location at which the representation of the application is positioned may be based on the context of the CGR environment. The context may be determined based on non-image data that is separate from image data of the physical environment being captured for the CGR environment. As examples, the non-image data may relate to the user, a user preferences, a user attribute, a user gesture, motion, activity, or interaction, semantics related to user input or an external source of information, the current time, date, or time period, information from another device involved in the CGR, etc.

17 Claims, 10 Drawing Sheets

CONTEXT-BASED APPLICATION PLACEMENT

CROSS-REFERENCE TO RELATED APPLICATIONS

This application claims the benefit of U.S. Provisional Application Ser. No. 62/836,818 filed Apr. 22, 2019, which is incorporated herein in its entirety.

TECHNICAL FIELD

The present disclosure generally relates to computer generated reality (CGR) environments, and in particular, to systems, methods, and devices that provide access to applications ("apps") in CGR environments.

BACKGROUND

An "app" or "application" refers herein to a software application or program that can be executed or used on an electronic device such as a smart phone, tablet, head-mounted device, desktop, or laptop. Electronic devices provide desktop interfaces, home screen interfaces, and other settings in which users are able to access one or more of the applications stored on the device or applications that are available from remote sources. Access to applications on electronic devices that provide CGR environments, however, may be non-intuitive, in-convenient, and burdensome for users, especially in circumstances in which the CGR environment is complex or the user may be interested in accessing one or more of many potential applications.

SUMMARY

In some implementations, representations of applications are identified, positioned, or configured in a CGR environment based on context. A representation of an application may be a 2D or 3D icon, 2D or 3D application content, video content of the application, or any other visual or audible electronic content associated with or provided by the application that can be positioned within the CGR environment. The location at which the representation of the application is positioned may be based on the context of the CGR environment. The context may be determined based on non-image data that is separate from image data of the physical environment being captured for the CGR environment. As examples, the non-image data may relate to the user, user preferences, user attributes, user gestures, motion, activity, or interaction, semantics related to user input or an external source of information, the current time, date, or time period, information from another device involved in the CGR environment, etc.

In some implementations, a device or system performs a method to provide a CGR environment with a representation of an application. The method may include obtaining, using a camera, image data of a physical environment. The method may include determining a context determined based on non-image data separate from the image data. For example the context may include user information identifying one or more of the following: user attributes (e.g. the user is 18 years old), user preferences (e.g., the user enjoys reading the news at breakfast while sitting at a table), user gestures, motions, activities (e.g., the user claps his hands to view exercise-related applications), user attention (e.g., the user is looking at the microwave), user interactions (e.g., the user is turning on the oven), semantic data (e.g., the room is the kitchen and there is a table), information or messages from other devices (e.g., the user has a friend in the room), time and date information (e.g., it is breakfast time), location information (e.g. global positioning system (GPS) location of the device), etc.

The method may include presenting a computer generated reality (CGR) environment using the image data, where a representation of an application is positioned at a location in the CGR environment based on the context. For example, a representation of a news app may be positioned on or near a table based on there being a table, the user preference, and the current time. As another example, a representation of a quick breakfast recipe app may be positioned near the microwave based on the user looking at the microwave and the current time being within a time period designated breakfast. The context can be also be used to determine how to represent the application (e.g., where to position a representation, which representation to use, the size or shape of the representation, whether the representation is in front of or behind other content, the distance of the representation from the user, whether the representation is two dimensional (2D) or three dimensional (3D), which icon or specific content from an application to use for the representation, etc.). Which applications are represented can also be selected based on the context. For example, different applications may be represented at breakfast time than in the evening based on user preferences for different types of activities at different times.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
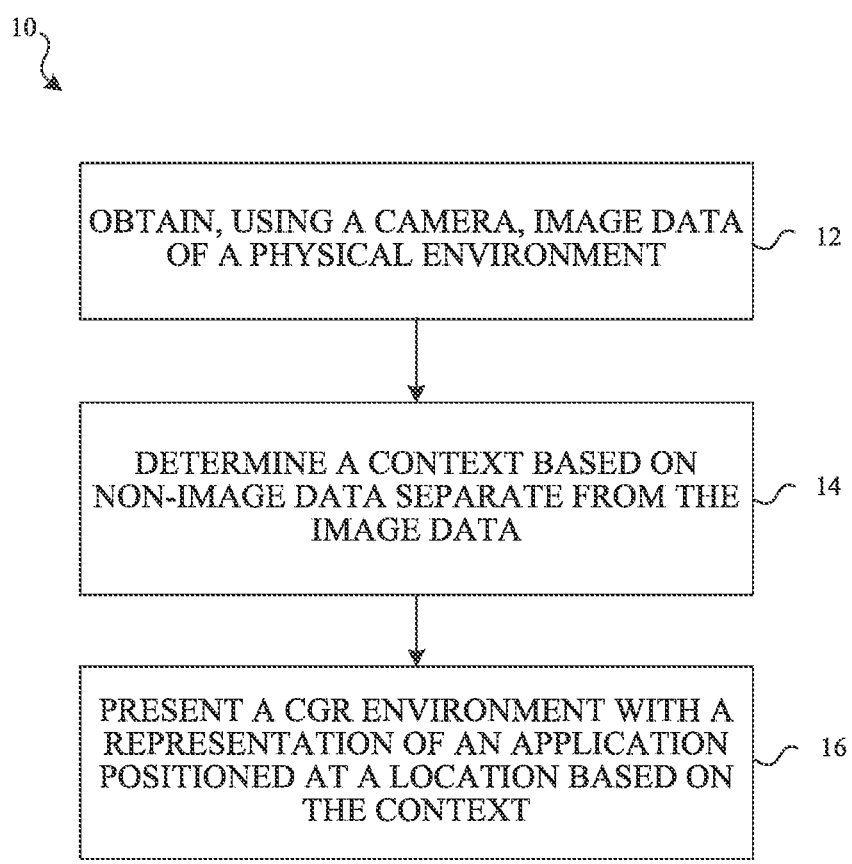
FIG. 1 is a flowchart representation of a method of context-based application placement.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a flowchart representation of a method 10 of context-based application placement. In some implementations, the method 10 is performed by a device (e.g., device 1100 of FIG. 11). The method 10 can be performed at a mobile device, head mounted device (HMD), desktop, laptop, or server device. In some implementations, the method 10 is performed by processing logic, including hardware, firmware, software, or a combination thereof. In some implementations, the method 10 is performed by a processor executing code stored in a non-transitory computer-readable medium (e.g., a memory).

At block 12, the method 10 obtains, using a camera, an image of a physical environment. In some implementations, the image is a live image captured by a camera that is part of the device that is performing method 10. For example, a device, such as device 1100 of FIG. 11, may receive images from one or more image capture devices (e.g., image sensor system(s) 1114). In some implementations, the camera captures a sequence of images (e.g., video frames) some or all of which are to be rendered on a display (e.g., display(s) 1112) of the device. A computer vision task (e.g., segmentation, depth estimation, normal direction estimation, object detection, semantic labelling, etc.) may also be performed on some or all of the images of such a sequence of images.

At block 14, the method 10 determines a context based on non-image data separate from the image data. In some implementations, the context is identified by accessing a user profile to identify an attribute or preference of the user, e.g., user age, user interests, user CGR history, user CGR statistic (e.g., average use per day), user educational history, user vocation, user job history, user application preferences, etc. A user preference may associate a particular application or application type with a particular type of context. For example, a user preference may identify that the user enjoys reading the news (e.g., news applications) at breakfast while sitting at a table. User preferences may be explicitly or manually provided by a user or may be learned via an automated process or machine learning technique based on user behavior or may involve a combination of user-provided preference information and learned information, e.g., the user identifies the preference to read the news in the morning and the system learns that the user reads the news in the morning while sitting at a table by observing a pattern of consistent user behavior.

In some implementations, the context is identified by receiving or identifying a user gesture, motion, action, or other activity. The context may identify that a particular user activity (e.g., hand clapping) is indicative of or associated with use of particular applications or representations of such applications at particular locations. For example, the context may be that the user has clapped his or her hands and that hand clapping is associated with using exercise related applications. User gestures, motion, action, or other activity may be identified via sensors on one or more devices that are worn or held by the user (e.g., handheld device motion, head mounted device motion, haptic glove motion, haptic suit motion, motion tracked via camera on held or worn device, etc.). The sensors may include, but are not limited to: one-to-tri-axial accelerometers for measuring changes in velocity along one to three axes, one-to-tri-axial axis gyroscopes for measuring angular velocity about one to three axes, one-to-tri-axial magnetometers for measuring information regarding magnetic fields relative to one to three axes, cameras, and active or passive infrared, visible light, or electromagnetic tracking. In some implementations, sensor data is received from a separate device in the local scene or a remote location. For example, the method 10 may be performed by a mobile phone or head-mounted device (HMD) that receives sensor data from a watch the user is wearing or from a remote global positioning system (GPS) server.

In some implementations, the context is identified by identifying that the user has interacted with a particular real or virtual objects in the CGR environment. For example, the user's actions or inputs may be tracked using sensors or input devices. Such actions and input may result in selection of objects in the environment. The device, for example, may determine that the user has turned on an oven in the CGR environment. For example, a sensor or camera image may be used to determine that the user has extended his or her hand and made a rotational motion and information from an oven or camera image may be used to determined that the oven was turned on at the same time as the user motion. Based on this information, the user interaction of turning on the oven may be identified.

In some implementations, the context is identified by identifying or tracking the user's attention or interest. For example, the context may be that the user is looking at or otherwise paying attention to a real or virtual microwave. In some implementations, what a user is paying attention to or interested in is determined based on identifying a pose (position and orientation) of the user's eye, head or body. For example, a user's gaze may be tracked using one or more images of the user's eye, head, or body. In some implementations, a camera on a device worn or held by the user captures images of the user's eye, head, or body that are used to identify to what the user is paying attention to or interested in. In some implementations, a user's gaze is tracked over time to identify when a user's gaze changes to look at a new object, how long the user has gazed at an object, how attentive the user is with respect to the object, etc. Characteristics of the user's gaze, eye state (e.g., pupil dilation), head position, body position, etc. at a point in time or over the course of time may be used to identify that the user is currently paying attention to or interested in a particular object. In some implementations, the context simply identifies that the user is currently paying attention to or interested in a particular object.

The user's eye, head, and body characteristics may be used to identify how strongly the user is interested in or paying attention to a particular object based on various criteria. Thus, in some implementations, the context identifies a measure of strength of attention or interest in a particular object, e.g., identifying that the user is very interested in the microwave because the user has looked at the microwave for more than a threshold amount of time or that the user is mildly interested in the weather because the user has looked at an umbrella more than 3 times but less than 5 times in the last 5 minutes.

In some implementations, the context is determined via semantic analysis of the CGR environment. For example, one or more images of the physical environment or information about virtual object depicted in the CGR environment may be analyzed to identify semantic labels for objects or activities currently in the CGR environment, that occurred previously, or that may possibly, likely, or definitely occur in the future during the experience. In one example, images of the physical environment are used to identify that the CGR is occurring in a room, that the room is a kitchen, and that there is a table in the kitchen.

In some implementations, the context is determined using information received from other devices, such as devices of other users that are participating in or observing the CGR environment. For example, the context may be that the user is alone, that the user is joined by 2 friends in the CGR environment, or that the user is joined by unknown users in the CGR environment. The context thus can include information about other users in the CGR environment including, but not limited to, information about the number of other users in the CGR environment, the type or relationship (e.g., spouse, friend, work colleague, boss, client, mother, stranger, child, novice SR user, etc.) of other users in the CGR environment, the preferences of other users in the CGR environment, the distance from the user of the other users in the CGR environment, the activity or state of the other users in the CGR environment, etc.

In some implementations, the context is determined by identifying information of the physical environment from one or more sensors on the user's device or other devices. For example, sensor data from a sensor (e.g., I/O device(s) and sensor(s) 1106 of FIG. 11) can be used to determine an image capture condition such as camera device height, image capture device angle, geographic location, time, etc. The sensors include, but are not limited to, barometric pressure sensor for measuring atmospheric pressure, a clock, an ambient light sensor for measuring ambient light, and the like. In some implementations, sensor data is received from a separate device in the local scene or a remote location.

In some implementations, the context is determined using algorithmic determinations or thresholds. For example, a threshold may be used to determine that a user preference exists. To do so, for example, a user's use of applications can be tracked and stored with data about the context in which the applications are used. For example, on five different days the user may have accessed a news application. The context may be based on identifying that on all five days, the user accessed the news application between 8:00 am and 9:00 am, in the kitchen, sitting at the table. This information may be algorithmically assessed to determined that the user has a preference for accessing a news application between 8:00 am and 9:00 am, in the kitchen, sitting at the table. A user preference may be identified based on determining that use of an application in a particular context occurred in a way that satisfies a threshold (e.g., more than 4 occurrences ever, more than 4 occurrences in the last 10 uses of the application, more than 40% of the user's use of the application, etc.).

In some implementations, the context is determined via a machine learning technique that outputs a context based on image data, sensor data, user information, information from other devices, or information from other sources about the CGR environment. In some implementations, a machine learning model can be, but is not limited to being, a deep neural network (DNN), an encoder/decoder neural network, a convolutional neural network (CNN), or a generative adversarial neural network (GANN). In some implementations, the machine learning model is configured to identify user preferences based on past activities of the user in one or more CGR environments and contexts. To do so, for example, a user's use of applications can be tracked and stored with data about the context in which the applications are used and the application/context information assessed by a neural network to identify user preferences.

At block 16, the method 10 further involves presenting a computer generated reality (CGR) environment with a representation of an application positioned at a location based on the context. To do so, the method 10 may identify an object in the CGR environment that is related to the context based on semantic matching or object-to-context associations. For example, a news application may be positioned on a table based there being a "table" type object in the physical environment and a user preference for reading the news app while seated at a table. In other words, the "table" object may be identified based on matching with the "table" in the user preference context. Other types of semantic matching, associations, or rules can similarly be used to identify where to position a representation of an application.

The positioning of a representation of an application may be based on identifying an object in the CGR environment based on the context identifying the user's gaze or attention. For example, a quick breakfast recipe application may be positioned near the microwave based on the user looking at the microwave and the current time being within a time period associated with breakfast. In this example, which application to represent is determined by matching the title or content of the application "quick breakfast recipe" with keywords associated with the context, e.g., "breakfast" and "microwave." Where to display the representation of the application is also determined based on the context, e.g., based on the user currently looking at the microwave, the representation is displayed near the microwave.

FIGS. 4-10, discussed below, provide additional examples of application representations identified, positioned, and configured based on context.

In some implementations, positioning a representation of an application involves applying matching criteria, matching rules, randomness, combinations of such factors, or other such techniques. In some implementations, positioning a representation of an application involves assessing multiple potential positions (e.g., on or near particular objects, surfaces, open spaces, user movement paths, along the user's current and predicted future gaze directions, etc.) and selecting a position for the representation from amongst the multiple potential positions using criteria, rules, randomness, combinations of such factors, or other techniques. In some implementations, doing so involves identifying an object, space, path, etc. that is associated with the context, for example, based on semantic associations, learned associations, user-specified associations, or other associations.

In some implementations, a system tracks, learns, or stores associations between contexts and object types. Such associations may be general (e.g., for many users) or user-specific (e.g., only for the particular user). For example, contexts containing keywords or otherwise associated with "breakfast," "lunch," "dinner," "meal," "mealtime," "snacktime," "kitchen," "hungry," "food," "eat," etc. may be associated with oven type objects, stove type objects, refrigerator type objects, etc.

Such associations between contexts and objects may be weighted. For example, associations between contexts and objects may be weighted to indicate a stronger relative association between "breakfast" and "microwave" than between "breakfast" and "oven." When determining where to position a representation of an application, the associations between context and objects can be taken into account, e.g., so that the representation of an application in an breakfast context is positioned near the microwave rather than near the oven. Randomness can be used to introduce variability or to break ties.

Associations between contexts and objects used for positioning applications can be learned based on use of applications in particular context. For example, users may reposition a breakfast recipe application while preparing breakfast to a location near the oven rather than near the microwave and the association may be automatically updated accordingly, e.g., to change the relative weighting of the breakfast-to-microwave and breakfast-to-oven associations. Associations can also be determined or adjusted based on application use. For example, the user may use an application more in a particular context when it is positioned near one object as opposed to when the representation of the application is positioned near another object, for example, because the user notices the representation in one location more easily than another. The system may update the associations between context and object accordingly.

In some implementations, representations are positioned in multiple locations (e.g., based on random factors) on different occurrences during a learning phase during which context-to-object association are learned or adjusted. For example, during a first month the system may position the recipe application near the microwave, oven, and table objects 10 time each in the breakfast context and identify that the user most frequently uses the recipe application (e.g., 6 of 10 times) when the recipe application is positioned near the microwave. The system may then adjust the context to object associations to increase the association between breakfast and microwave or decrease the association between breakfast and oven and the association between breakfast and table.

The context can be also be used to determine how to represent an application. For example, the context may be used to determined which representation to use, the size or shape of the representation, whether the representation is in front of or behind other content, the distance of the representation from the user, whether the representation is two dimensional (2D) or three dimensional (3D), which icon or specific content from an application to use for the representation, etc.

Which applications are represented in the CGR environment can also be selected based on the context. For example, different applications may be represented at breakfast time than in the evening based on user preferences for different types of activities at different times. In some implementations, the system identifies a predetermined number of applications (e.g., 5) to represent in the CGR environment. As the experience progresses and the context changes, the 5 representations applications change (e.g., representing different applications, in different locations, with different configurations).

In some implementations, a machine learning model is used to select, position, or configure representations of applications in a CGR environment. In some implementations, a neural network or other machine learning model is trained to receive image data of the physical environment or CGR environment, non-image data indicative of context of the CGR environment, or data about one or more available applications (e.g., images of the applications user interface, content of the application, metadata, keywords, etc.). The neural network or other machine learning model may be trained to produce output that identifies objects in the CGR environment, identifies spaces for applications in the CGR environment, identifies paths (e.g., where the user is going) in the CGR environment, identifies associations between contexts and objects, spaces, or paths, identifies which application or application should be represented in the CGR environment, identifies positions for representations of applications, or identifies configuration parameters (e.g., size, shape, icon v. content, etc.) of representations of applications.

Figure 2:
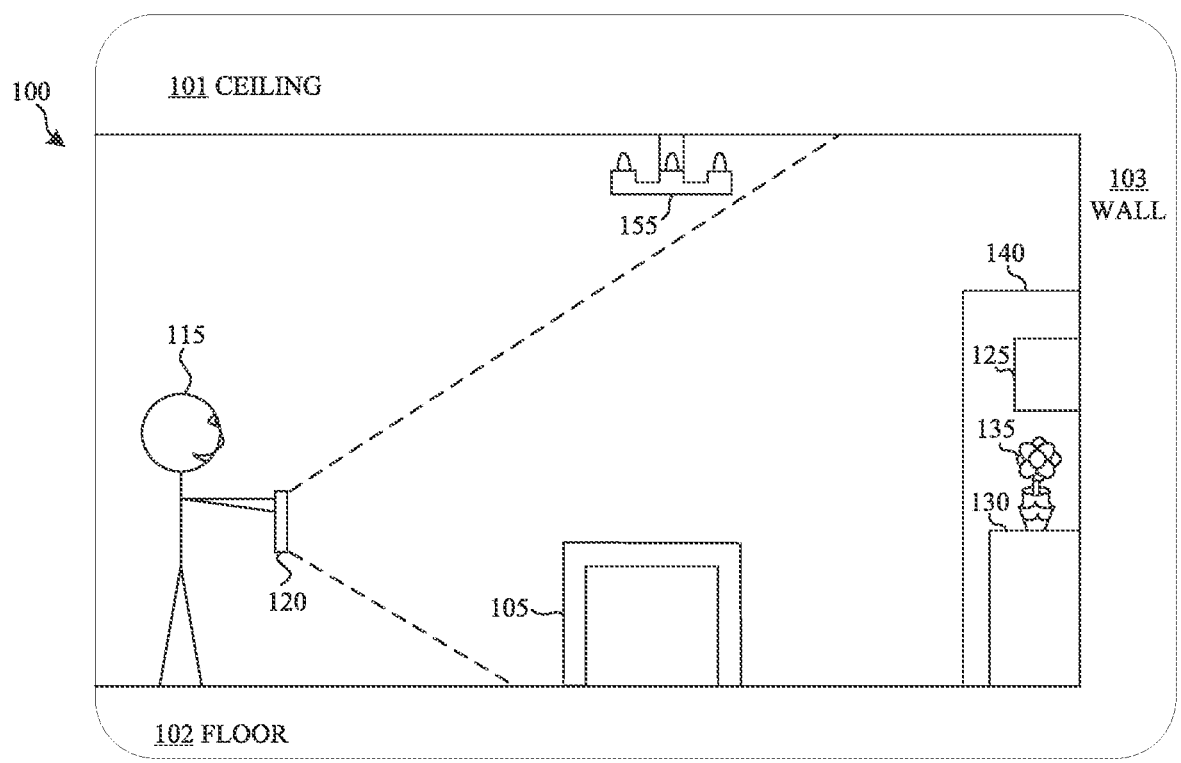
FIG. 2 is a block diagram illustrating a device capturing a first image of a physical environment.
Figure 3:
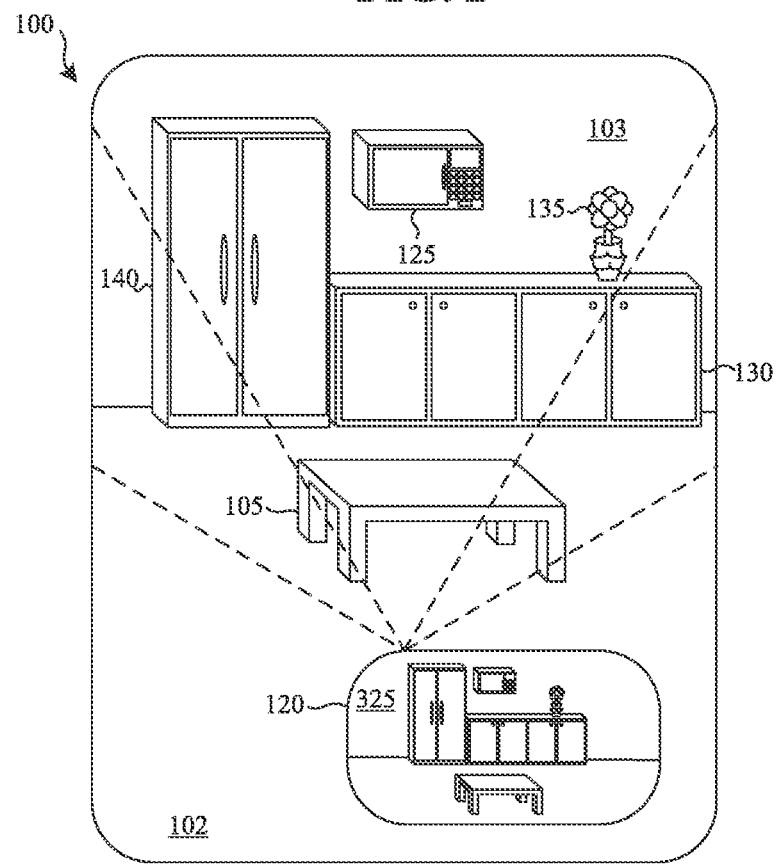
FIG. 3 is a block diagram illustrating another view of the device of FIG. 2 capturing the first image.

FIGS. 2 and 3 are block diagrams illustrating a user 115 using a device 120 that is capturing a first image 325 of a physical environment 100. While pertinent features are shown, those of ordinary skill in the art will appreciate from the present disclosure that various other features have not been illustrated for the sake of brevity and so as not to obscure more pertinent aspects of the example implementations disclosed herein. o A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell. In FIGS. 2 and 3, the physical environment 100 includes a room having a ceiling 101, a floor 102, and a wall 103. The room includes a table 105, a refrigerator 140, a microwave 125, a counter 130, flowers 135, and light fixture 155.

In some implementations, the device 120 is configured with a suitable combination of software, firmware, or hardware to manage and coordinate a computer generated reality (SR) experience for the user 115. In some implementations, a controller (not shown) separate from device 120 includes a suitable combination of software, firmware, or hardware to facilitate the CGR environment on the device 120. In some implementations, the controller 110 is a computing device that is local or remote relative to the physical environment 100 and in communication with the device 120. In one example, the controller is a local server located within the physical environment 100. In another example, the controller is a remote server located outside of the physical environment 100 (e.g., a cloud server, central server, etc.). In some implementations, the controller is communicatively coupled with the device 120 via one or more wired or wireless communication channels (e.g., BLUETOOTH, IEEE 802.11x, IEEE 802.16x, IEEE 802.3x, etc.).

According to some implementations, the device 120 presents a computer generated reality (CGR) experience to the user while the user is present within the physical environment 100. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense or interact with a CGR object using any one of their senses, including sight, sound, touch, taste, and smell. For example, a person may sense or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense or interact with virtual objects in the VR environment through a simulation of the person's presence within the computer-generated environment, or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 4:
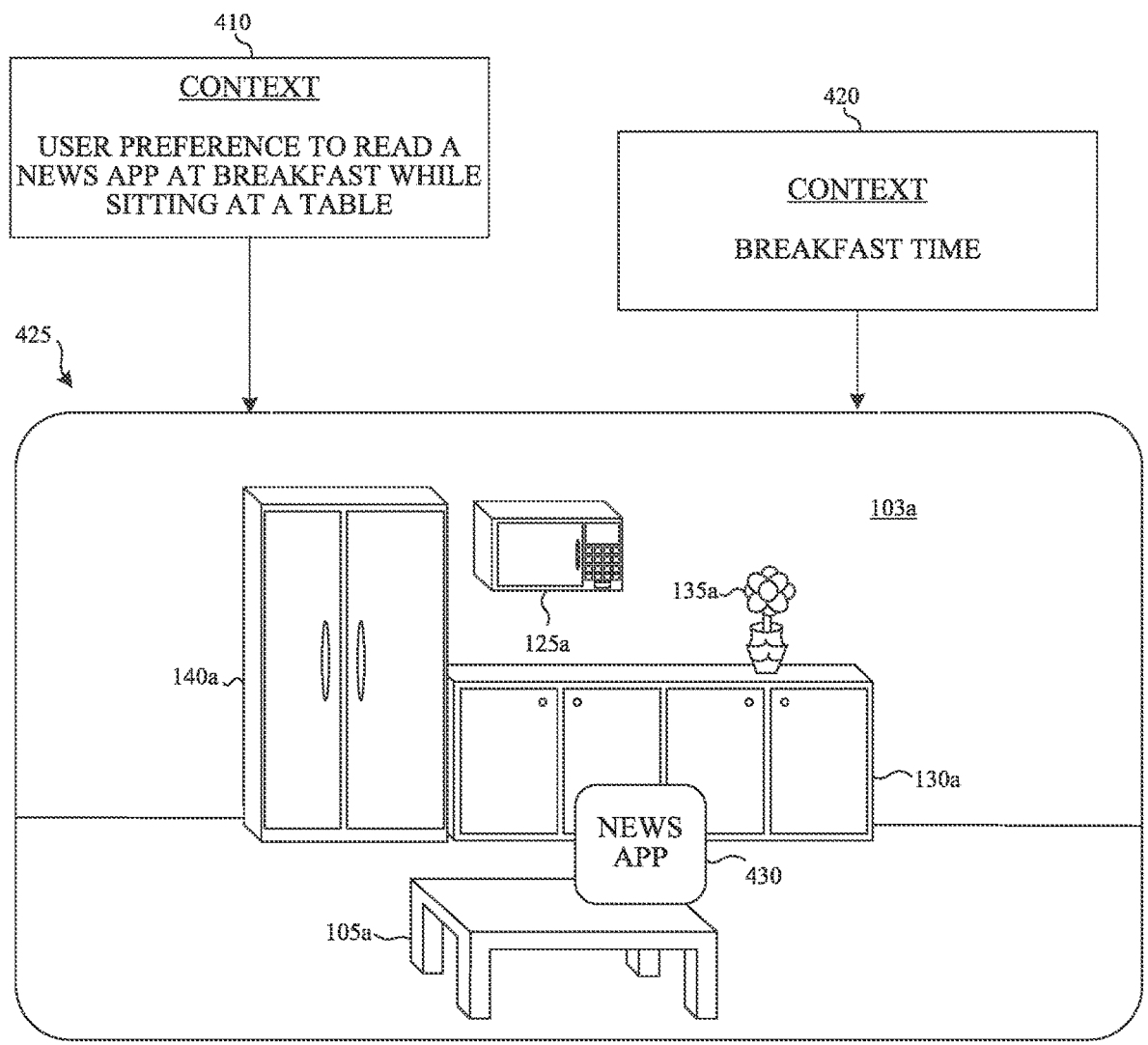
FIG. 4 is a block diagram illustrating a CGR environment in which a representation of an application is positioned based on an exemplary context.

FIG. 4 is a block diagram illustrating a CGR environment 425 in which a representation 430 of an application is positioned based on an exemplary context. In this example, the CGR environment 425 includes a wall depiction 103a, a table depiction 105a, a refrigerator depiction 140a, a microwave depiction 125a, a counter depiction 130a, and a flower depiction 135a of the wall 103, table 105a, refrigerator 140, microwave 125, counter 130, and flowers 135 of the physical environment 100 of FIGS. 2-3, respectively. The CGR environment 425 also includes a representation 430 of a news application that is identified, configured, and positioned based on the context. In this example, the context includes a first context 410 of a user preference to read a news application at a breakfast and a second context 420 identifying that it currently is breakfast time. Based on this context, the device providing the CGR environment 425 identifies the news application, determines to represent the news application using an icon, and determines to position the representation 430 of the news application at a location near the table depiction 105a.

Figure 5:
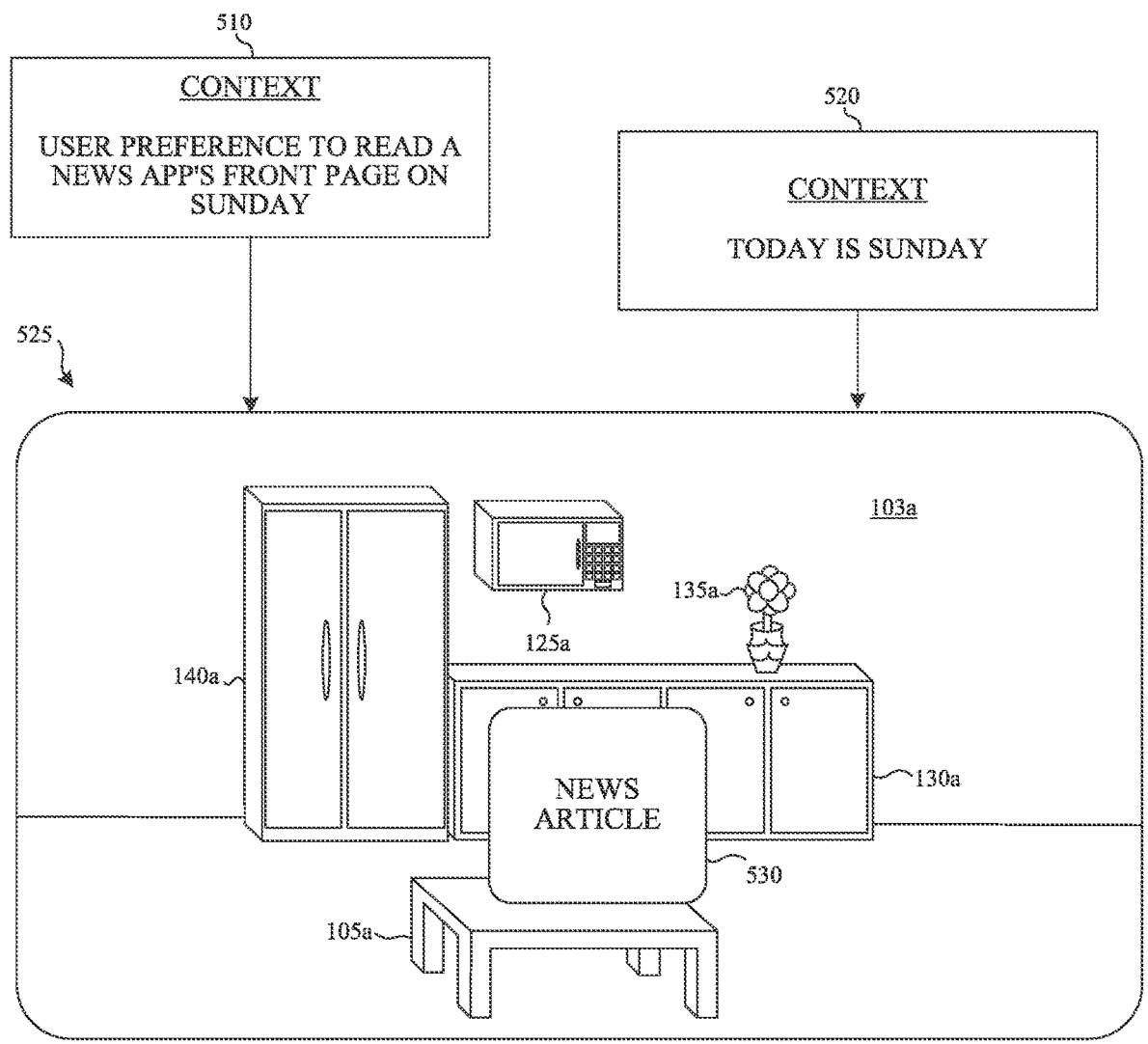
FIG. 5 is a block diagram illustrating another CGR environment in which a representation of an application is positioned based on another exemplary context.

FIG. 5 is a block diagram illustrating another CGR environment 525 in which a representation 530 of an application is positioned based on another exemplary context. In this example, the CGR environment 525 includes a wall depiction 103a, a table depiction 105a, a refrigerator depiction 140a, a microwave depiction 125a, a counter depiction 130a, and a flower depiction 135a of the wall 103, table 105a, refrigerator 140, microwave 125, counter 130, and flowers 135 of the physical environment 100 of FIGS. 2-3, respectively. The CGR environment 525 also includes a representation 530 of a news application that is identified, configured, and positioned based on the context. In this example, the context includes a first context 510 of a user preference to read a news application's front page on Sunday and a second context 520 identifying that it currently is Sunday. Based on this context, the device providing the CGR environment 525 identifies the news application, determines to represent the news application using a front page article (e.g., app content rather than icon), and determines to position the representation 530 of the news application at a location near the table depiction 105a.

Figure 6:
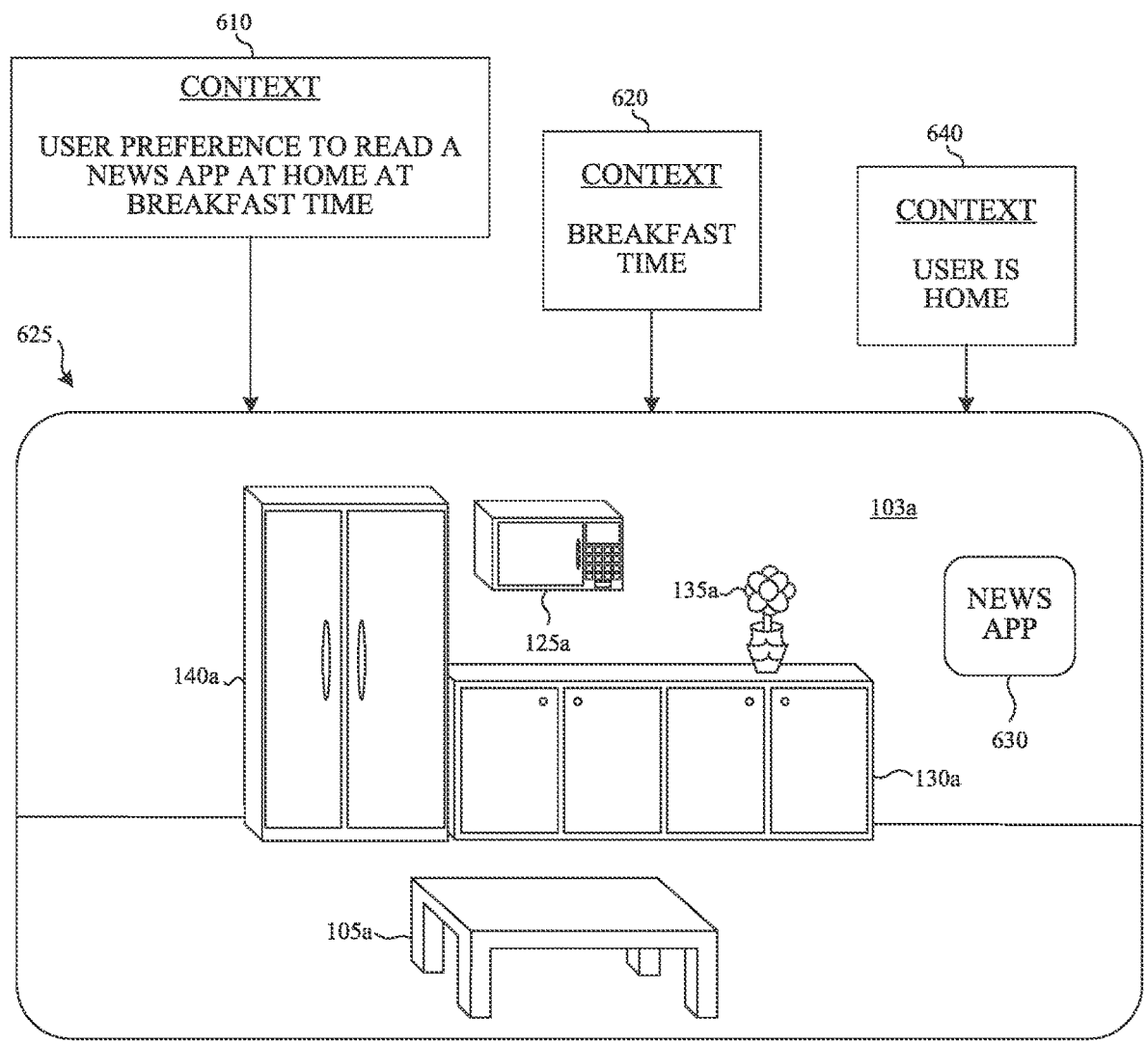
FIG. 6 is a block diagram illustrating another CGR environment in which a representation of an application is positioned based on another exemplary context.

FIG. 6 is a block diagram illustrating another CGR environment 625 in which a representation 630 of an application is positioned based on another exemplary context. In this example, the CGR environment 625 includes a wall depiction 103a, a table depiction 105a, a refrigerator depiction 140a, a microwave depiction 125a, a counter depiction 130a, and a flower depiction 135a of the wall 103, table 105a, refrigerator 140, microwave 125, counter 130, and flowers 135 of the physical environment 100 of FIGS. 2-3, respectively. The CGR environment 625 also includes a representation 630 of a news application that is identified, configured, and positioned based on the context. In this example, the context includes a first context 610 of a user preference to read a news application at home at breakfast time, a second context 620 identifying that it currently is breakfast time, and a third context 640 identifying that the user is currently at home. Based on this context, the device providing the CGR environment 625 identifies the news application, determines to represent the news application using an icon, and determines to position the representation 630 of the news application on the wall depiction 103a. As the user goes to other rooms in the user's home during the experience, the representation 630 is automatically moved to other walls in those rooms so that the user always has access to the news application while at home during breakfast time.

Figure 7:
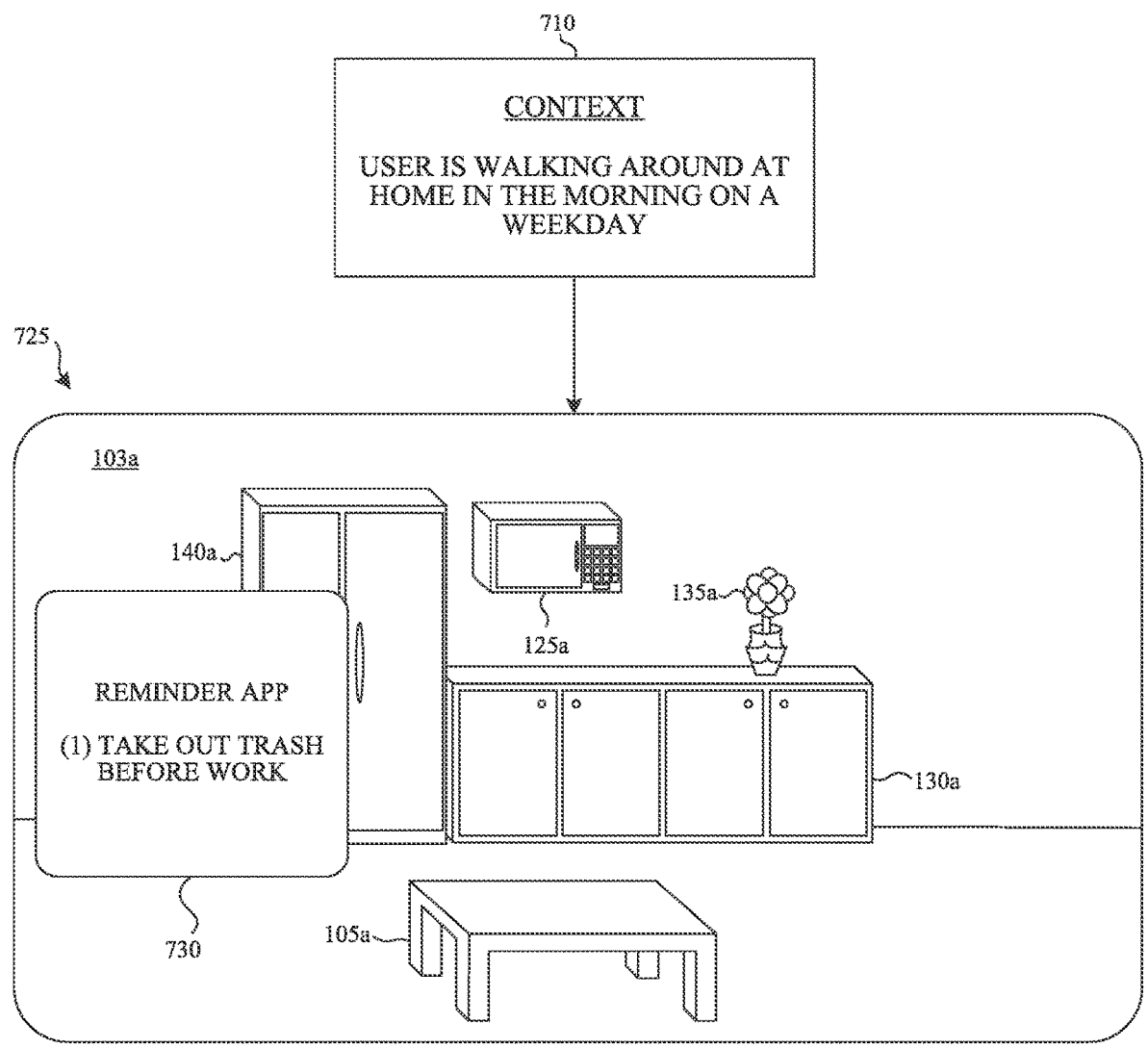
FIG. 7 is a block diagram illustrating another CGR environment in which a representation of an application is positioned based on another exemplary context.

FIG. 7 is a block diagram illustrating another CGR environment 725 in which a representation 730 of an application is positioned based on another exemplary context. In this example, the CGR environment 725 includes a wall depiction 103a, a table depiction 105a, a refrigerator depiction 140a, a microwave depiction 125a, a counter depiction 130a, and a flower depiction 135a of the wall 103, table 105a, refrigerator 140, microwave 125, counter 130, and flowers 135 of the physical environment 100 of FIGS. 2-3, respectively. The CGR environment 725 also includes a representation 730 of a reminder application that is identified, configured, and positioned based on the context. In this example, the context 710 identifies that the user is walking around at home in the morning on a weekday. Based on this context, the device providing the CGR environment 725 identifies the reminder application, identifies applicable content within the reminder application, determines to represent the reminder application using the identified content, and determines to position the representation 730 of the reminder application in a space in the CGR environment that is along one of the potential paths the user may take while continuing to walk around. As the user goes to other rooms in the user's home during the experience, the representation is automatically moved to other locations so that the user is confronted with the reminder application until the context is no longer applicable, e.g., when the user leaves the home, the day ends, etc.

Figure 8:
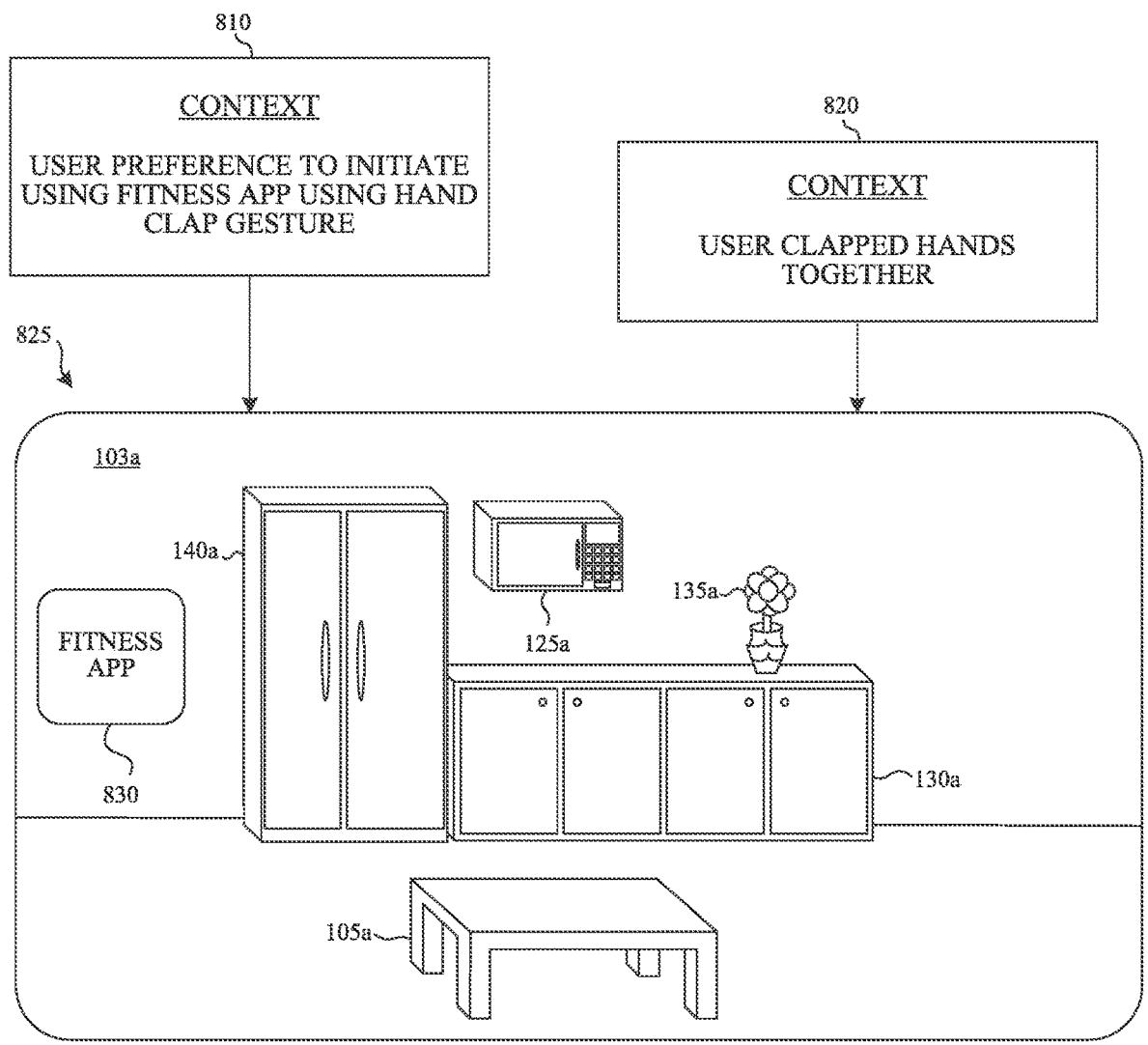
FIG. 8 is a block diagram illustrating another CGR environment in which a representation of an application is positioned based on another exemplary context.

FIG. 8 is a block diagram illustrating another CGR environment 825 in which a representation 830 of an application is positioned based on another exemplary context. In this example, the CGR environment 825 includes a wall depiction 103a, a table depiction 105a, a refrigerator depiction 140a, a microwave depiction 125a, a counter depiction 130a, and a flower depiction 135a of the wall 103, table 105a, refrigerator 140, microwave 125, counter 130, and flowers 135 of the physical environment 100 of FIGS. 2-3, respectively. The CGR environment 825 also includes a representation 830 of a fitness application that is identified, configured, and positioned based on the context. In this example, the context includes a first context 810 of a user preference to initiate using a fitness application using a hand clap gesture and a second context 620 identifying that the user has clapped his or her hands together. Based on this context, the device providing the CGR environment 825 identifies the fitness application, identifies that the fitness application should be represented by its icon rather than its content, and determines to position the representation 830 of the fitness application in an open space in the CGR environment.

Figure 9:
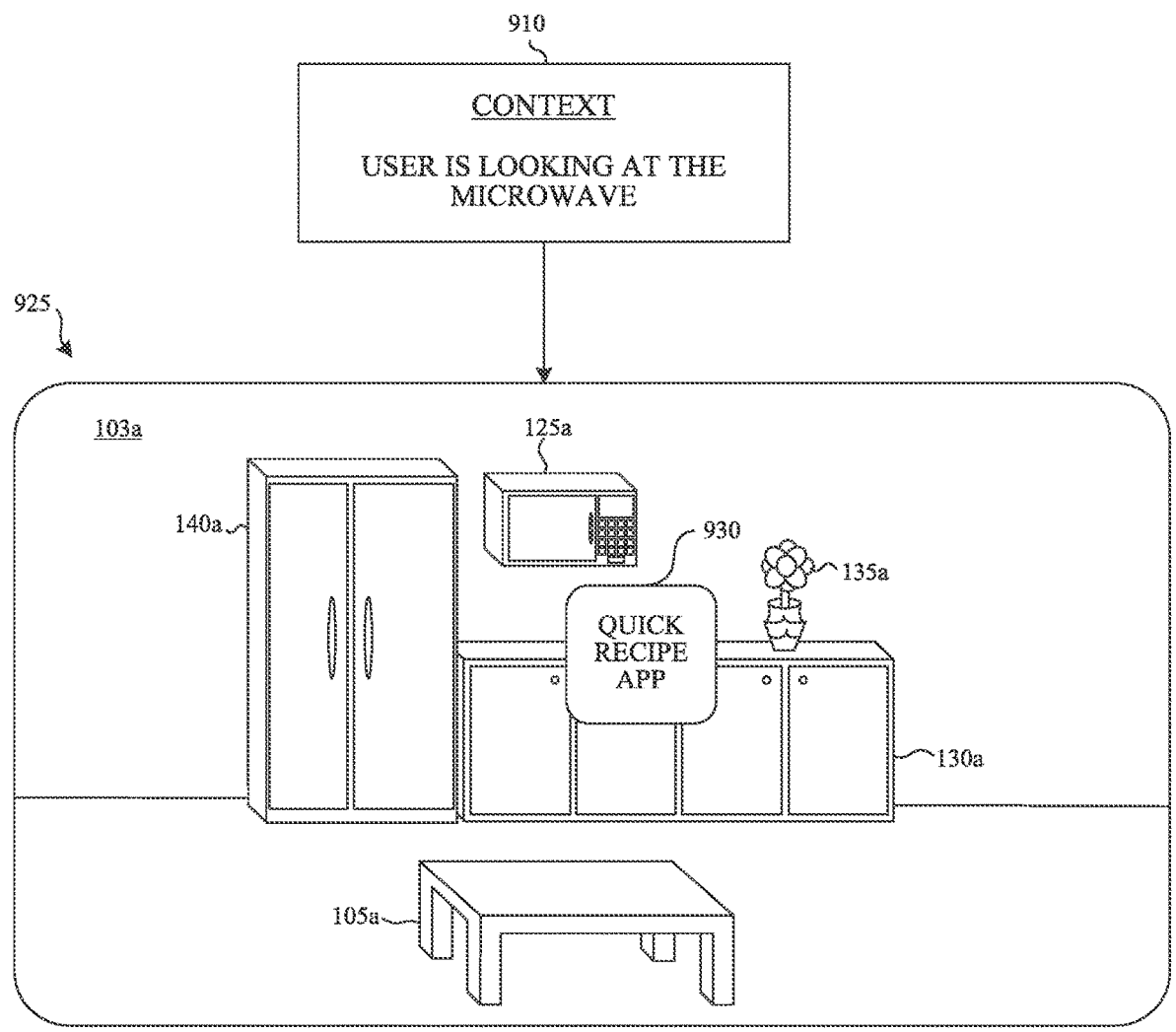
FIG. 9 is a block diagram illustrating another CGR environment in which a representation of an application is positioned based on another exemplary context.

FIG. 9 is a block diagram illustrating another CGR environment 925 in which a representation 930 of an application is positioned based on another exemplary context. In this example, the CGR environment 925 includes a wall depiction 103a, a table depiction 105a, a refrigerator depiction 140a, a microwave depiction 125a, a counter depiction 130a, and a flower depiction 135a of the wall 103, table 105a, refrigerator 140, microwave 125, counter 130, and flowers 135 of the physical environment 100 of FIGS. 2-3, respectively. The CGR environment 925 also includes a representation 930 of a quick recipe application that is identified, configured, and positioned based on the context. In this example, the context 910 identifies that the user is looking at the microwave. Based on this context, the device providing the CGR environment 925 identifies the quick recipe application, determines that it should be represented by an icon, and determines to position the representation 930 of the quick recipe application near the microwave.

Figure 10:
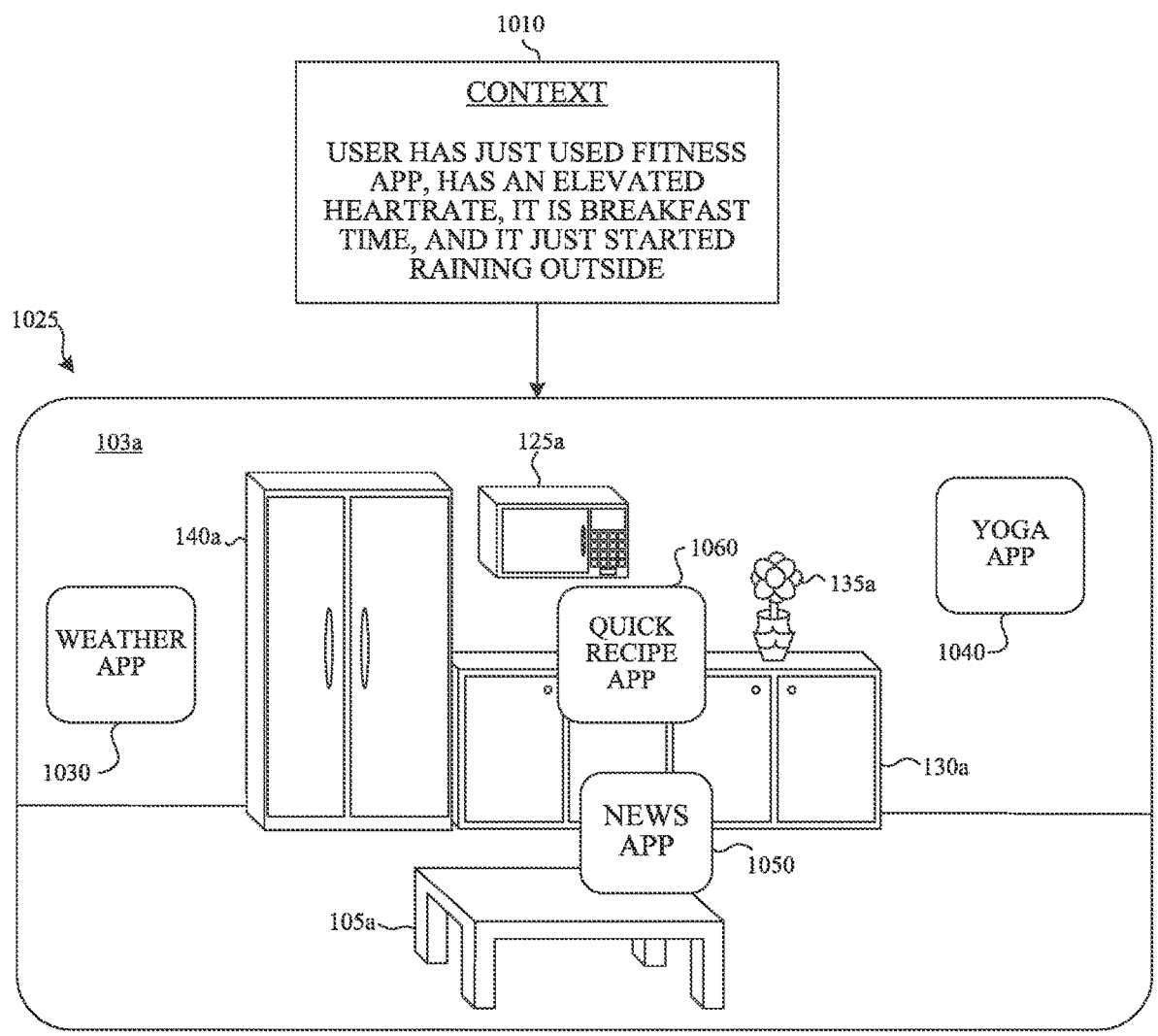
FIG. 10 is a block diagram illustrating another CGR environment in which representations of multiple applications are positioned based on another exemplary context.

FIG. 10 is a block diagram illustrating another CGR environment 1025 in which representations 1030, 1040, 1050, 1069 of various applications are positioned based on another exemplary context. In this example, the CGR environment 1025 includes a wall depiction 103a, a table depiction 105a, a refrigerator depiction 140a, a microwave depiction 125a, a counter depiction 130a, and a flower depiction 135a of the wall 103, table 105a, refrigerator 140, microwave 125, counter 130, and flowers 135 of the physical environment 100 of FIGS. 2-3, respectively. The CGR environment 1025 also includes representations 1030, 1040, 1050, 1069 of applications that are identified, configured, and positioned based on the context. In this example, the context 1010 identifies that the user just finished using a fitness application, has an elevated heartrate, it is breakfast time, and it just started raining outside. Based on this context, the device providing the CGR environment 1025 identifies the weather application, determines to represent it using an icon, and determines to position the representation 1030 of the weather app in open space. Based on the context, the device providing the CGR environment 1025 also identifies the yoga application, determines to represent it using an icon, and determines to position the representation 1040 of the yoga app in another open space (based in part on representation 1030 occupying what would otherwise have been open space). Based on the context, the device providing the CGR environment 1025 also identifies the news application, determines to represent it using an icon, and determines to position the representation 1050 of the news application near the table 105a. Based on this context, the device providing the CGR environment 1025 also identifies the quick recipe application, determines that it should be represented by an icon, and determines to position the representation 1060 of the quick recipe application near the microwave 125a. In this example, the positioning of the representations 1030, 1040, 1050, 1069 of applications may be based on both the context and the applications, e.g., the news application representation 1050 is positioned near the table because there is an association between the news application and table objects, while the quick recipe application 1060 is positioned near the microwave because there is an association between the quick recipe application and microwave objects.

Figure 11:
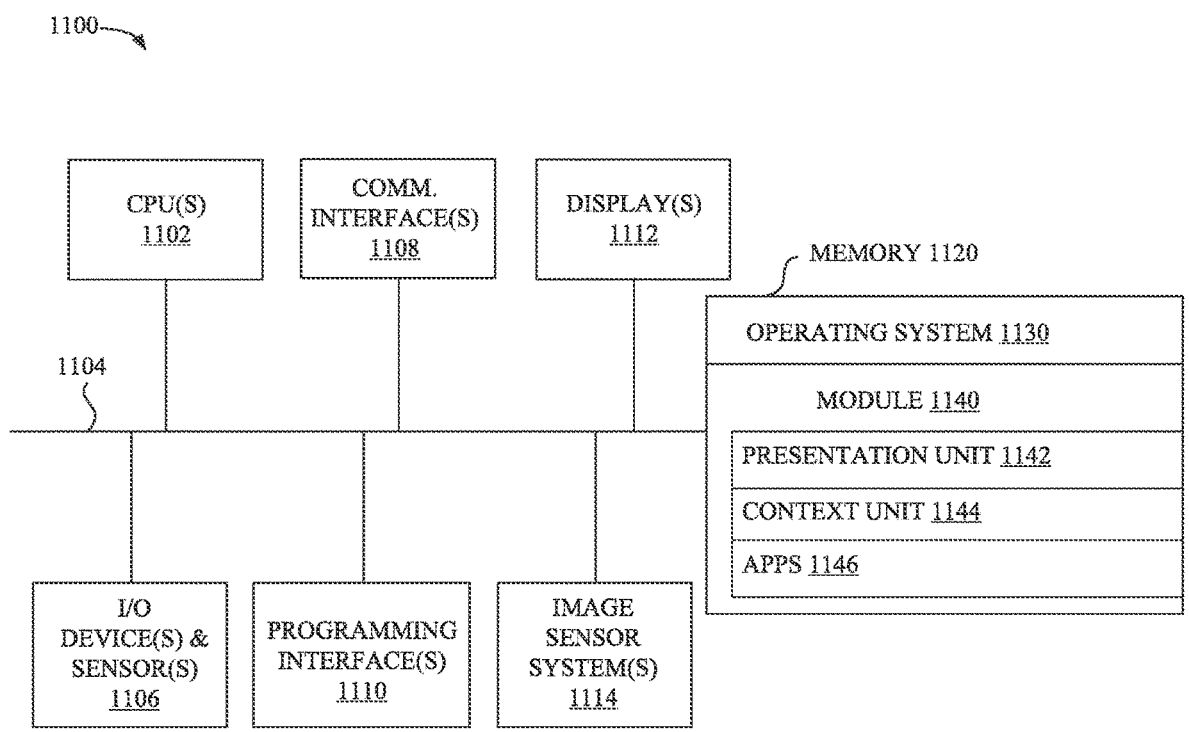
FIG. 11 is a block diagram of an example system architecture of an exemplary device in accordance with some implementations.

FIG. 11 is a block diagram of an example system architecture of an exemplary device configured to facilitate computer vision tasks in accordance with one or more implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1100 includes one or more processing units 1102 (e.g., microprocessors, ASICs, FPGAs, GPUs, CPUs, processing cores, or the like), one or more input/output (I/O) devices and sensors 1106 (e.g., camera, depth camera, IR camera, microphone, heart rate monitor, IMU, accelerometer, light sensor, etc.), one or more communication interfaces 1108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 1110, one or more displays 1112, one or more interior or exterior facing image sensor systems 1114, a memory 1120, and one or more communication buses 1104 for interconnecting these and various other components.

In some implementations, the one or more communication buses 1104 include circuitry that interconnects and controls communications between system components. In some implementations, the one or more I/O devices and sensors 1106 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 1112 are configured to present images from the image sensor system(s) 1114. In some implementations, the one or more displays 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 1112 correspond to diffractive, reflective, polarized, holographic, etc. waveguide displays. For example, the device 1100 includes a single display. In another example, the device 1100 is a head-mounted device that includes a display for each eye of the user.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 1102. The memory 1120 comprises a non-transitory computer readable storage medium. In some implementations, the memory 1120 or the non-transitory computer readable storage medium of the memory 1120 stores the following programs, modules and data structures, or a subset thereof including an optional operating system 830 and a computer vision module 1140.

The operating system 1130 includes procedures for handling various basic system services and for performing hardware dependent tasks. In some implementations, the module 1140 is configured to facilitate providing a CGR environment with representations of applications that are identified, positioned, or configured using the techniques disclosed herein. The module 1140 includes a presentation unit 1142 for presenting the CGR environments, a context unit 1144 for determining the context of a CGR environment (e.g., using image or non-image data), and applications 1146 that are represented and used by the user(s) in the CGR environments.

FIG. 11 is intended more as a functional description of the various features which are present in a particular implementation as opposed to a structural schematic of the implementations described herein. As recognized by those of ordinary skill in the art, items shown separately could be combined and some items could be separated. For example, some functional modules and units shown separately could be implemented in a single module or unit and the various functions of single functional blocks could be implemented by one or more functional blocks in various implementations. The actual number of modules and units and the division of particular functions and how features are allocated among them will vary from one implementation to another and, in some implementations, depends in part on the particular combination of hardware, software, or firmware chosen for a particular implementation.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the terms "or" and "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modifications may be implemented by those skilled in the art without departing from the scope and spirit of the invention.

What is claimed is:

1. A method comprising:
   on a computing device having a processor, memory, and a camera:
   obtaining, using the camera, image data of a physical environment;
   determining a location on a surface of an object in the physical environment on which to position a representation of an application by:
   identifying the object in the physical environment;
   determining an object type of the object;
   determining that the user is proximate to the object in the physical environment;
   identifying a user preference for using the application while the user is proximate to objects of the object type; and
   based on the user being proximate to the object and the determined object type corresponding to the object type of the user preference, determining the location to position the representation of the application in accordance with the user preference; and
   presenting a computer generated reality (CGR) environment using the image data, wherein the representation of the application is positioned at the location in the CGR environment.

2. The method of claim 1 further comprising selecting the application for inclusion in the CGR environment based on the user being proximate to the object and the determined object type corresponding to the object type of the user preference.

3. The method of claim 1, wherein the location is further determined based on a user attribute.

4. The method of claim 1, wherein the location is further determined based on a user gesture, motion, activity, or interaction.

5. The method of claim 1, wherein the location is further determined based on semantics identified from user input or an external source.

6. The method of claim 1, wherein the location is further determined based on a current time, current date, or current time period.

7. The method of claim 1, wherein the the location is further determined based on information from another device involved in the CGR environment at the physical environment.

8. The method of claim 1, further comprising determining an attribute of the representation of the application based on the user being proximate to the object and the determined object type corresponding to the object type of the user preference.

9. The method of claim 8, wherein the attribute is a size of the representation, whether the representation is two dimensional or three dimensional, or whether to display an icon or specific content from the application.

10. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
      obtaining, using the camera, image data of a physical environment;
      determining a location on a surface of an object in the physical environment on which to position a representation of an application by:
         identifying the object in the physical environment
         determining an object type of the object;
         determining that the user is proximate to the object in the physical environment
         identifying a user preference for using the application while the user is proximate to objects of the object type; and
         based on the user being proximate to the object and the determined object type corresponding to the object type of the user preference, determining the location to position the representation of the application in accordance with the user preference; and
      presenting a computer generated reality (CGR) environment using the image data, wherein the representation of the application is positioned at the location in the CGR environment.

11. The system of claim 10, wherein the operations further comprise selecting the application for inclusion in the CGR environment based on the user being proximate to the object and the determined object type corresponding to the object type of the user preference.

12. The system of claim 10, wherein the location is further determined based on:
   a user preference;
   a user attribute;
   a user gesture;
   a user motion;
   a user activity;
   or a user interaction with the CGR environment.

13. The system of claim 10, wherein the location is further determined based on semantics identified from user input or an external source or a current time, current date, or current time period.

14. The system of claim 10, wherein the location is further determined based on information from another device involved in the CGR environment at the physical environment.

15. The system of claim 10, wherein the operations further comprise determining an attribute of the representation of the application based on the user being proximate to the object and the determined object type corresponding to the object type of the user preference, wherein the attribute is a size of the representation, whether the representation is two dimensional or three dimensional, or whether to display an icon or specific content from the application.

16. A non-transitory computer-readable storage medium, storing program instructions computer-executable on a computer to perform operations comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
      obtaining, using the camera, image data of a physical environment;
      determining a location on a surface of an obj ect in the physical environment on which to position a representation of an application by:
         identifying the object in the physical environment
         determining an object type of the object;
         determining that the user is proximate to the object in the physical environment
         identifying a user preference for using the application while the user is proximate to objects of the object type; and
         based on the user being proximate to the object and the determined object type corresponding to the object type of the user preference, determining the location to position the representation of the application in accordance with the user preference; and
      presenting a computer generated reality (CGR) environment using the image data, wherein the representation of the application is positioned at the location in the CGR environment.

17. The non-transitory computer-readable storage medium of claim 16, wherein the operations further comprise selecting the application for inclusion in the CGR environment based on the user being proximate to the object and the determined object type corresponding to the object type of the user preference.

* * * * *

UNITED STATES PATENT AND TRADEMARK OFFICE
CERTIFICATE OF CORRECTION

| | | |
|---|---|---|
| PATENT NO. | : 11,804,014 B1 | Page 1 of 1 |
| APPLICATION NO. | : 16/845461 | |
| DATED | : October 31, 2023 | |
| INVENTOR(S) | : Daniele Casaburo et al. | |

It is certified that error appears in the above-identified patent and that said Letters Patent is hereby corrected as shown below:

In the Claims

Column 17, Line 10 reads:
"...claim 7, wherein the the..."

Should read:
--...claim 7, wherein the...--

Signed and Sealed this
Nineteenth Day of December, 2023

*Katherine Kelly Vidal*

Katherine Kelly Vidal
*Director of the United States Patent and Trademark Office*